Jan. 29, 1963 R. W. FISK 3,075,630
ARTICLE SYNCHRONIZING CONVEYER
Filed March 9, 1959 2 Sheets-Sheet 1

INVENTOR
Robert W. Fisk

BY
Mead, Browne, Schuyler & Beveridge
ATTORNEYS

Jan. 29, 1963 R. W. FISK 3,075,630
ARTICLE SYNCHRONIZING CONVEYER
Filed March 9, 1959 2 Sheets-Sheet 2

INVENTOR.
ROBERT FISK
BY
ATTORNEYS 3,075,630
ARTICLE SYNCHRONIZING CONVEYER
Robert W. Fisk, Sunnyvale, Calif., assignor to Mathews
 Conveyer Company, Ellwood City, Pa., a corporation
 of Pennsylvania
Filed Mar. 9, 1959, Ser. No. 798,214
12 Claims. (Cl. 198—76)

This invention relates to conveyor systems for distribution of articles and particularly concerns systems in which articles are positioned at selected locations on a moving conveyor element.

In automatic distribution systems, article manipulating devices are frequently operated when a specific location on a moving conveyor element reaches the manipulating device. Unless the article is properly positioned with respect to such specific location, the article manipulating device may be operated prematurely or belatedly with a resulting improper manipulation of the article or even failure of the article manipulating device to properly engage an article. For example, a pusher for removing selected articles from a conveyor may be actuated when a certain point on the moving conveyor element passes a fixed point at the pusher element. If the article is in advance or behind the selected location, the pusher element may improperly engage the article or fail to engage it.

A major object of this invention is to provide apparatus for exactly positioning articles at selected locations on a continuously moving conveyor element. More specifically, an object of this invention is to provide a conveyor system with a synchronizing conveyor element for properly positioning articles with respect to selected locations on a continuously moving conveyor in the system.

Another object of this invention is to provide a speed control for a conveyor element effective to adjust the speed of the conveyor so regardless of the time when an article is placed on the conveyor element it is moved to a particular location a fixed period of time after reception of a signal.

In the attainment of these objects, an important feature of the invention resides in the arrangement of a variable speed conveyor normally moving at a velocity corresponding to the velocity of a continuously moving conveyor and decelerated upon the arrival of an article at a selected point on the synchronizing conveyor. This deceleration is continued until a signal is generated according to the position of a selected location on the continuously moving conveyor with respect to the discharge end of the synchronizing conveyor. Then, deceleration is arrested and the synchronizing conveyor is accelerated to the speed of the continuously moving conveyor to discharge the article on to the continuously moving conveyor when the selected location arrives at the discharge end of the synchronizing conveyor. Synchronization is accomplished by assuring that the terminal or discharge velocity of the synchronizing conveyor is equal to the velocity of the continuously moving conveyor. Preferably, this is effected by delaying acceleration of the synchronizing conveyor for a time interval corresponding to the difference between a minimum or zero velocity of the synchronizing conveyor and the velocity at which deceleration of the synchronizing conveyor is arrested when a signal is received from the continuously moving conveyor.

Another important feature of this invention resides in the operation of a speed controller for a conveyor element to decelerate the conveyor element from a maximum velocity in response to the arrival of an article at a selected position. This deceleration of the conveyor element is discontinued by a signal and the conveyor element is accelerated to its maximum velocity after a time delay period corresponding to the difference between the decelerated velocity and a minimum or zero velocity. Operation of the speed controller is effected by a first piston which shifts the speed controller to decelerate the conveyor element and a second piston which shifts the speed controller to accelerate the conveyor element after the desired time interval. An article on the conveyor element causes a shifting of the second piston to its minimum velocity position at which it is spaced from the speed controller element and supplies a metered flow of fluid to the first piston for shifting the speed controller to decelerate the conveyor and move the speed controller toward the second piston. In response to a signal, the supply of fluid to the first piston is cut off and a metered flow of fluid is supplied to the second piston. The velocity of the conveyor element remains constant until the second piston reaches a point corresponding to the decelerated velocity where it operates the speed controller to accelerate the conveyor element to its maximum velocity.

Other objects, advantages and features of the invention shall become apparent from the following specification and accompanying drawings, wherein.

Figure 1:
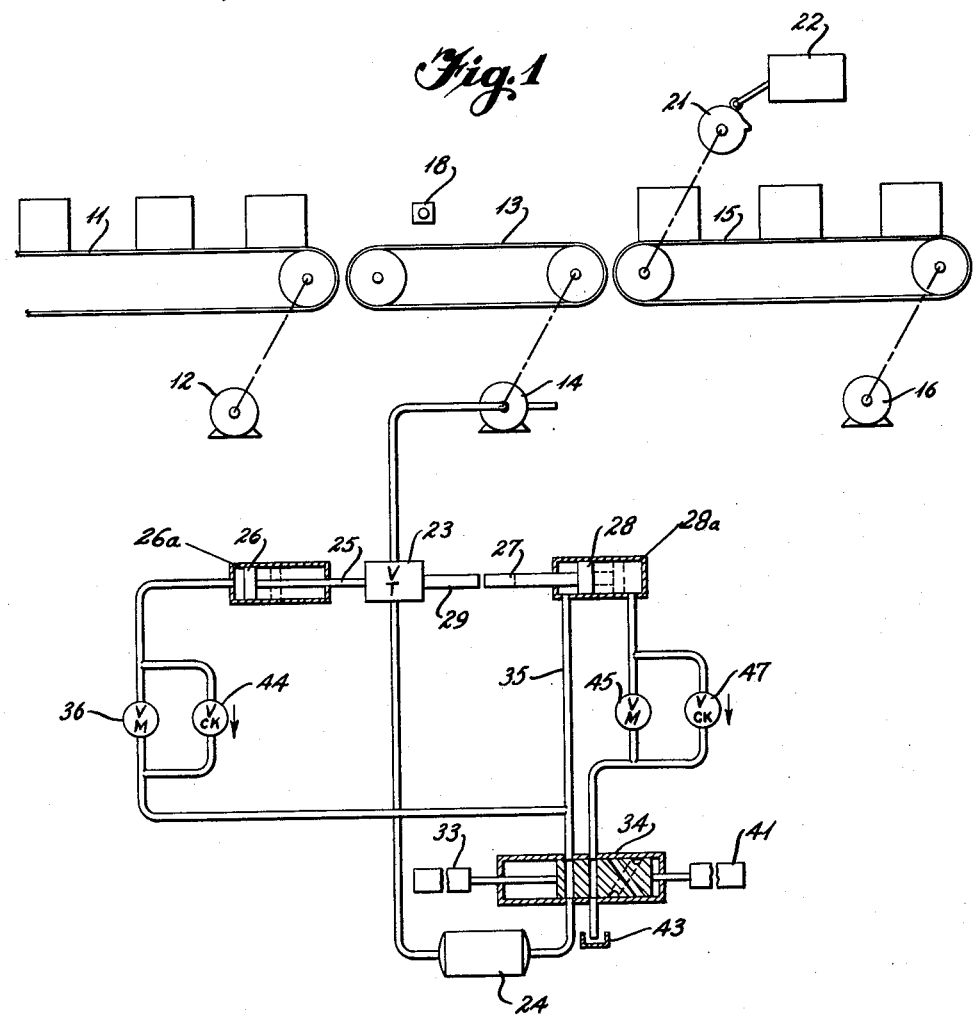
FIG. 1 is a diagrammatic view of a conveyor system embodying the invention in its preferred form and showing schematically a speed control for a synchronizing conveyor.

As illustrated in FIG. 1, random spaced articles are conveyed on a continuously moving conveyor 11, which may be a belt conveyor, driven at a substantially constant speed by a motor 12 to transfer the articles one at a time onto a synchronizing conveyor 13. Synchronizing conveyor 13 is driven by a variable speed motor 14 for depositing the articles equally spaced at selected locations on a conveyor 15 continuously driven by a motor 16. Conveyor 15, which may be a belt conveyor, carries the articles past a series of article manipulating devices (not shown) which are actuated automatically when certain selected locations of the continuously moving conveyor 15 pass such manipulating devices. Unless the articles are exactly positioned at the selected locations on the continuously moving conveyor 15, the manipulating devices will be operated according to the position of the selected locations on the conveyor and may improperly engage or even fail to engage an article which should be in that selected location.

In order that articles will be properly positioned in the selected locations on conveyor 15, the speed of motor 14 is controlled to vary the speed of synchronizing conveyor 13 so each article on synchronizing conveyor 13 is discharged onto a selected location of conveyor 15.

This variation in the speed of motor 14 is controlled so the synchronizing conveyor 13 is normally moved at a maximum velocity corresponding approximately to the velocity of conveyors 11 and 15. When an article is transferred from conveyor 11 onto synchronizing conveyor 13, a sensing device such as photoelectric cell 18 is actuated to produce a signal which causes deceleration of motor 14. When a selected location on conveyor 15 reaches a certain position determined with respect to the discharge end of conveyor 13, a tracking device, such as cam 21 driven synchronously with conveyor 15, operates a signal generator or switch 22 to discontinue deceleration of the motor 14 and the synchronizing conveyor 13. At the same time actuation of switch 22 starts an acceleration cycle, which, after a time delay corresponding to the difference between the velocity of conveyer 13 at the time deceleration is arrested and a minimum velocity or zero velocity for conveyer 13 causes acceleration of the motor 14 so conveyer 13 transfers an article onto conveyer 15 a fixed time interval after operation of switch 22 generates a signal. Since switch 22 is always operated according to the relative position of a selected location on conveyer 15 and the discharge end of conveyer 13, the same time interval always elapses from the generation of the signal by switch 22 until the selected location of conveyer 15 is positioned to receive an article from conveyer 13. By using the same time interval to discharge an article from conveyer 13, the article is always discharged onto the selected location of conveyer 15.

Motor 14 may be a hydraulic motor the speed of which is controlled by a speed controller or throttle valve 23 to which fluid under pressure is conducted from a supply 24. Speed control valve 23 may be shifted by a piston rod 25 on a first fluid actuated piston 26 in a direction to reduce the flow of pressure fluid to motor 14 and thereby decelerate the motor. Movement of the speed control valve 23, in a direction to increase the flow of fluid to motor 14 and thereby accelerate the motor and synchronizing conveyer 13, may be effected by throttle valve acceleration control rod 29 arranged to be engaged by piston rod 27 on a second fluid operated piston 28. Pistons 26 and 28 are reciprocated within cylinders 26a and 28a, respectively.

Figure 2:
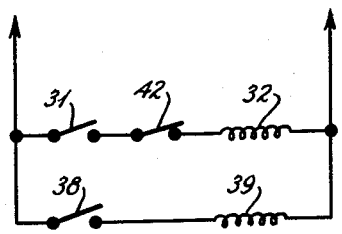
FIG. 2 is a circuit diagram of electrical controls for the system.

When an article on conveyer 13, which is normally moving at its maximum velocity, actuates a sensing device or a photoelectric cell 18, contacts 31 (FIG. 2) are closed to energize coil 32 of solenoid 33 for control valve 34. This shifts valve 34 in a direction to supply fluid under full pressure through a conduit 35 to shift piston 28 to the right as shown in FIG. 1, and thereby move rod 27 to its minimum velocity position. At the same time, fluid pressure from supply 24 is conducted through valve 34 to metering valve 36 for moving piston 26 at a fixed rate in a direction to shift valve 23 in a direction to decelerate motor 14 and synchronizing conveyer 13.

This deceleration continues at a fixed rate until the selected location on conveyer 15 reaches a predetermined position with respect to the discharge end of conveyer 13 whereupon tracking cam 21 operates signal generating switch 22 to close contacts 38 and energize coil 39 of solenoid 41 to reverse valve 34. Simultaneously contacts 42 of switch 22 are opened to de-energize coil 32 of solenoid 33. This reversing of valve 34 cuts off the flow of fluid to piston 26, and opens piston 26 and the rod end of piston 28 to atmosphere through vent 43. Fluid exhausted from cylinder 26a passes freely through check valve 44 bypassing metering valve 36.

At the same time, the other end of piston 28 is connected to pressure supply 24 through metering valve 45 to supply a metered flow of pressure fluid to move piston 28 and rod 27 at a uniform velocity toward the throttle valve accelerating control rod 29. Metering valves 36 and 45 are set to pass fluid at about the same rate so throttle valve 23 is shifted so the rate of acceleration of motor 14 approximately equals the rate of deceleration of that motor.

If the valve 34 remains in its decelerating position long enough for accelerating control rod 29 to engage piston rod 27, motor 14 and synchronizing conveyer 13 are decelerated to a minimum velocity which may be zero. The velocity of conveyer 13 will remain at this minimum until cam 21 actuates switch 22 to reverse valve 34 so the rod 27 on piston 28 shifts throttle valve acceleration control rod 29 to accelerate the motor 14 and conveyer 13.

In normal operation, cam 21 actuates switch 22 while throttle valve acceleration control rod 29 is spaced from the piston rod 27. Thus, when cam 21 actuates switch 22 to reverse valve 34, rod 29 is spaced from piston rod 27 a distance corresponding to a time interval which may be directly proportional to the difference between the minimum or zero velocity for the conveyer 13 and the velocity at which deceleration is arrested. After the lapse of this time interval piston rod 27 moves acceleration control rod 29 to shift the throttle valve 23 in a direction to accelerate the motor 14. Acceleration of motor 14 continues until the valve 23 reaches its maximum velocity position where velocity of motor 14 and conveyer 13 is the same as that of conveyer 15. The total time from the generation of the signal by switch 22 until the article is transferred from conveyer 13 to conveyer 15 equals the time necessary for the selected location on conveyer 15 to reach the position to receive an article from conveyer 15. After the article has been transferred to conveyer 15 and another article deposited on synchronizing conveyer 13 actuates photoelectric cell 18, the cycle is repeated by shifting piston 28 to its minimum velocity position. This shifting is effected by permitting exhaust from cylinder 28a through check valve 47 bypassing metering valve 45.

Under usual operating conditions, when an article is transferred from conveyor 11, synchronizing conveyer 13 is moving at its maximum velocity. As the article passes photocell 18, synchronizing conveyer 13 is decelerated below the velocity of distributing conveyer 15 until a selected location on distributing conveyor 15 passes a certain position when cam 21 actuates signal generating switch 22. This opens contacts 42 to de-energize solenoid 33 and closes contacts 38 to energize solenoid 41 and supply a metered flow of fluid pressure to the other side of piston 28. Throttle valve 23 is then moved in a direction to accelerate motor 14 until it reaches its maximum velocity and the article is transferred from conveyer 13 to conveyer 15.

In this situation the time interval for the selected location on conveyor 15 to reach a position to receive an article from conveyor 13 corresponds approximately to the time for accelerating piston 28 to move from its zero velocity position to its maximum velocity position. The speed of synchronizing conveyor 13 is controlled so the article arrives at conveyer 15 at the proper time to occupy the selected location on that conveyor.

When an article on conveyor 13 arrives at photoelectric cell 18 only a short interval before tracking device 21 actuates signal generating switch 22, the valve 34 will first be shifted to move piston rod 27 to its retracted position and initiate a decelerating cycle. Almost immediately, solenoid 41 is energized by the signal from switch 22 to shift the valve 34 to its accelerating position. When this occurs, the velocity of conveyor 13 remains near its maximum in order to transfer the article to the selected location on conveyer 15. This condition exists when, at the time the article arrives at photoelectric cell 18, the selected location on conveyor 15 is approximately the same distance from the transfer point as the photoelectric cell. Thus, the time required for the article to travel from the photoelectric cell 18 to the transfer point will correspond to that required for the selected location on conveyer 15 to travel to the same transfer point.

When an article on conveyer 13 arrives at the photoelectric cell considerably before the selected position on conveyor 15 will be ready to receive the article, piston 26 shifts the throttle valve 23 to its minimum velocity or zero velocity position. Conveyor 13 then remains at rest until switch 22 is actuated and acceleration control rod 29 is moved to shift throttle valve 23 in a direction to accelerate motor 14. Motor 14 is accelerated until it reaches its maximum velocity and then the article is transferred from conveyor 13 to conveyer 15. In this situation the time interval after actuation of signal generator 22 during which the selected location on conveyor 15 travels to a position to receive an article from conveyor 13 again corresponds approximately to the time for accelerating piston 28 to move from its zero velocity position to its maximum velocity position. There is no delay in acceleration of the synchronizing conveyor because it is at a minimum velocity when switch 22 is actuated.

The control effected on an article travelling on the synchronizing conveyor 13 may be analyzed mathematically to show that during a time interval required for synchronizing conveyor 13 to reach maximum speed at a controlled rate of acceleration, the article on conveyor 13 will have travelled a constant distance S from the check point, referring to photoelectric cell 18, after arrival of the signal from signal generator 22.

Under a condition where the signal from signal generator 22 arrives with the article at the check point, the speed of the article remains constant at a velocity V and the article travels the distance, (1) $$S = V \times T, \text{ for}$$

(2) $$t = \frac{V}{A} \text{ or } V = AT, \text{ then,}$$

(3) $$S = AT^2$$

Figure 3:
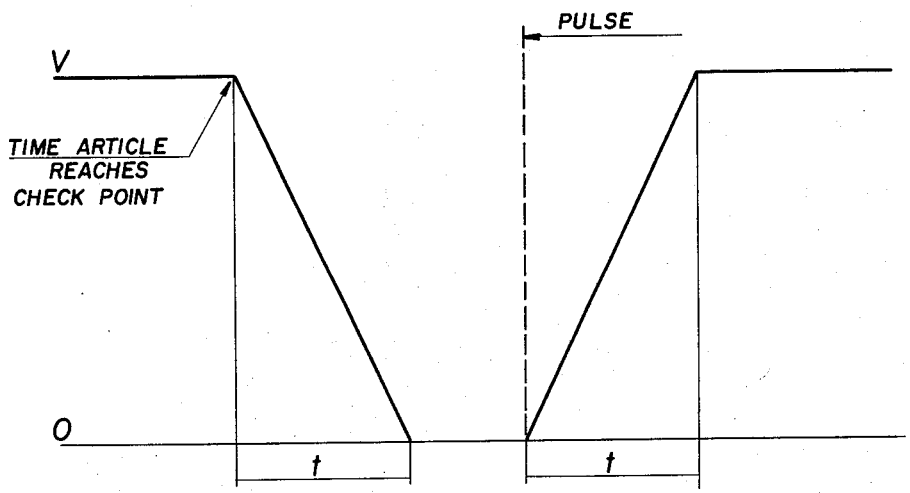
FIG. 3 is a velocity versus time diagram showing the operation of the system when the acceleration signal arrives after the article stops.

FIG. 3 shows a velocity versus time diagram in a situation where the signal generated by generator 22 arrives after an article on conveyor 13 (and conveyor 13) stops. In the diagram shown in FIG. 3, $V$ = the velocity at full or maximum speed, $T$ = the time to accelerate to speed $V$ from a minimum or zero velocity. As shown in the diagram of FIG. 3 the acceleration and deceleration rates are equal, i.e., the slopes of the velocity curves are equal. Under this condition, the distance travelled while stopping equals:

(4) $$\frac{V}{2} \times T$$

and, the distance travelled while starting equals (5) $$\frac{V}{2} \times T$$

The total distance S travelled from the check point is (6) $$S = \frac{V}{2} \times T + \frac{V}{2} \times T = VT$$

Since (2) $V = AT$, then, (7) $$S = AT^2$$

In all cases, therefore, the delay in acceleration of the synchronizing conveyor corresponds to the difference between the minimum velocity of the synchronizing conveyor and its actual velocity when the switch 22 is actuated. In this way the speed of the synchronizing conveyor is controlled to deliver the article to distributing conveyor 15 a certain period of time after switch 22 is actuated.

The embodiment illustrated is a preferred form of the invention. Many modifications of the invention defined in the appended claims will suggest themselves to those skilled in the art.

Figure 4:
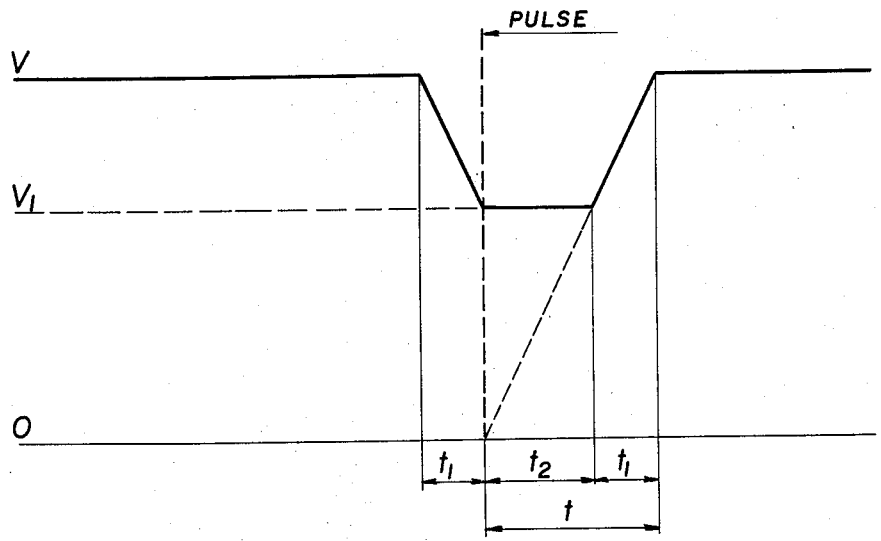
FIG. 4 is a velocity versus time diagram showing the operation of the system when the acceleration signal arrives before the article stops.

Now consider the situation where the signal pulse from signal generator 22 arrives before the article and conveyer 13 stop. This situation is shown in the FIG. 4 time versus velocity diagram where $V$ = the velocity at full speed, $V1$ = the velocity at time of arrival of the signal from signal generator 22, $T1$ = the time period where the article arrives ahead of the pulse from signal generator 22, T2 is a variable quantity equal to the time taken to accelerate the article to a speed V1 from rest and T equals the time to accelerate to the speed V from rest. It will be noted that $T_2$ is also the amount of time delay required before initiation of an acceleration cycle. Assume that the rates of acceleration and deceleration are substantially equal.

The distance travelled by the article during the time T1 equals (8) $$S_1 = \frac{(V + V_1) \times T_1}{2}$$

The distance travelled during the time interval T2 equals (9) $$S2 = V1 \times T2$$

Then the total distance travelled from the check point equals the sum of

(10) $$S = S1 + S2 + S1$$

(11) $$S = 2\left(\frac{V + V1}{2}\right)T1 + V1T2 = VT1 + V1T1 + V1T2$$

Since $V = AT = AT1 + AT2$, and $V1 = AT2$, then by substitution,

(12) $$S = (AT1 + AT2) \times T1 + AT1T2 + AT2^2$$
$$= AT1^2 + 2AT1T2 + AT2^2 = A(T1^2 + 2T1T2 + T2^2)$$
$$= A(T1 + T2)^2$$

Since $T = T1 + T2$, then $S = AT^2$, for any time $T1 < T > 0$.

What I claim is:

1. Apparatus for positioning articles in selected locations on a continuously moving conveyer element comprising a synchronizing conveyer in advance of the continuously moving conveyer, means actuated by an article on said synchronizing conveyer for decelerating said synchronizing conveyer at a controlled rate of deceleration, and means controlled by the continuously moving conveyer according to the position of the selected location for initiating acceleration at a controlled rate of the synchronizing conveyer to the speed of the continuously moving conveyer to transfer the article to the selected location on the continuously moving conveyer.

2. Apparatus for positioning articles at selected locations on a continuously moving conveyer element comprising a synchronizing conveyer in advance of the continuously moving conveyer, means actuated by an article on said synchronizing conveyer for causing deceleration at a controlled rate of said synchronizing conveyer, and means controlled by the continuously moving conveyer according to the position of the selected location for initiating an acceleration cycle to accelerate the synchronizing conveyer to the speed of the continuously moving conveyer to transfer the article to the selected location on the continuously moving conveyer.

3. Apparatus for positioning articles at selected locations on a continuously moving conveyer element comprising a synchronizing conveyer in advance of the continuously moving conveyer, means actuated by an article on said synchronizing conveyer for causing deceleration of said synchronizing conveyer, and means controlled by the continuously moving conveyer according to the position of the selected location for arresting deceleration of said synchronizing conveyer and initiating acceleration of the synchronizing conveyer after a time delay corresponding to the difference between a minimum velocity and the velocity of the synchronizing conveyer at which deceleration is arrested.

4. Apparatus for positioning articles at selected locations on a continuously moving conveyer element comprising a synchronizing conveyer in advance of the continuously moving conveyer, means actuated by an article on said synchronizing conveyer for causing deceleration of said synchronizing conveyer, and means controlled by the continuously moving conveyer according to the position of the selected location for initiating acceleration of the synchronizing conveyer after a time delay directly proportioned to the difference between a minimum velocity and the velocity of the synchronizing conveyer at which deceleration is arrested.

5. Apparatus for positioning articles at selected locations on a continuously moving conveyer element comprising a synchronizing conveyer in advance of the continuously moving conveyer, a speed controller for varying the velocity of the synchronizing conveyer between a minimum velocity and a maximum velocity corresponding to the velocity of the continuously moving conveyer, means actuated by an article on said synchronizing conveyer for operating said controller to decelerating said synchronizing conveyer from said maximum velocity, and means controlled by the continuously moving conveyer according to the position of the selected location for operating said controller to accelerate said synchronizing conveyer to said maximum velocity after a time delay corresponding to the difference between the minimum velocity and the velocity of said synchronizing conveyer at which deceleration is arrested.

6. Apparatus for positioning articles at selected locations on a continuously moving conveyer element comprising a synchronizing conveyer in advance of the continuously moving conveyer, power means for driving said synchronizing conveyer, a speed control for said power means to vary the speed of said synchronizing conveyer between a maximum velocity corresponding to the velocity of the continuously moving conveyer and a minimum velocity, a first fluid actuated piston for operating said speed controller to decelerate said synchronizing conveyer from said maximum velocity, a second fluid actuated piston for operating said speed controller to accelerate said synchronizing conveyer, means actuated by an article on said synchronizing conveyer for supplying a metered flow of fluid to said first piston for operating said controller to decelerate the synchronizing conveyer from said maximum velocity and for shifting said second fluid actuated piston to its minimum velocity position, and means actuated according to the position of a selected location on the continuously moving conveyer for discontinuing the flow of fluid to said first piston and supplying a metered flow of fluid to said second piston for moving said second piston from its minimum velocity position to operate said speed controller when said second piston is moved to a position corresponding to the velocity at which deceleration was arrested and accelerating said synchronizing conveyer to said maximum velocity.

7. Apparatus for positioning articles at selected locations on a continuously moving conveyer element comprising a synchronizing conveyer in advance of the continuously moving conveyer, signal generating means actuated synchronously with the continuously moving conveyer according to the position of a selected location on the continuously moving conveyer with respect to the discharge end of the synchronizing conveyer, a sensing device positioned to be actuated by articles on said synchronizing conveyer, a speed controller for varying the velocity of said synchronizing conveyer between a first velocity corresponding to the velocity of the continuously moving conveyer and a second velocity, means actuated by said sensing device responsive to an article on said synchronizing conveyer for operating said speed controller to decelerate said synchronizing conveyer from said first velocity, and means responsive to said signal generator for operating said speed controller to initiate an acceleration cycle for accelerating said synchronizing conveyer to said first velocity after a time delay corresponding to the difference between a minimum velocity and said second velocity at which deceleration of said synchronizing conveyer is arrested.

8. A control system for a movable conveyer element comprising power means for driving said conveyer element, a speed controller for varying the speed of the conveyer element between a minimum velocity and a maximum velocity, a sensing device responsive to an article on the conveyer element for operating said speed controller to decelerate the conveyer element from said maximum velocity, and a signal generator for controlling the operation of said speed controller to accelerate the conveyer element to said maximum velocity after a time delay corresponding to the difference between said minimum velocity and the velocity at which deceleration is arrested.

9. A speed control for a moving conveyer element comprising a speed controller for varying the speed of the conveyer element between a minimum velocity and a maximum velocity, a first fluid actuated piston for operating said speed controller to decelerate the conveyer element from said maximum velocity, a second fluid actuated piston for operating said speed controller for accelerating the conveyer element, means actuated by an article on the conveyer element for supplying a metered flow of fluid to said first piston for moving said speed controller to decelerate the conveyer element from said maximum velocity and for moving said second piston to its minimum velocity position, and signal generator means for discontinuing the flow of fluid to said first piston and supplying a metered flow of fluid to said second piston for moving said second piston from its minimum velocity position to shift said speed controller to accelerate the conveyer element after a time delay corresponding to the difference between said minimum velocity and the velocity at which deceleration is arrested.

10. Apparatus for positioning articles at selected locations on a continuously moving conveyer element comprising a synchronizing conveyer in advance of the continuously moving conveyer, means actuated by an article on said synchronizing conveyer for causing deceleration of said synchronizing conveyer, and means controlled by the continuously moving conveyer according to the position of the selected location on said continuously moving conveyer for initiating acceleration of the synchronizing conveyer after a time delay related to the velocity of the synchronizing conveyer at the time when the deceleration of said synchronizing conveyer is terminated.

11. Apparatus for positioning articles at selected locations on a continuously moving conveyer element comprising a synchronizing conveyer in advance of the continuously moving conveyer, a speed controller for varying the velocity of the synchronizing conveyer at a controlled rate, means actuated by an article on the synchronizing conveyer for operating said speed controller to vary the velocity of said synchronizing conveyer from a normal velocity corresponding to the speed of the continuously moving conveyer to a different velocity, and means controlled by the continuously moving conveyer according to the position of the selected location for operating said speed controller to return the velocity of said synchronizing conveyer to said normal velocity at said controlled rate, whereby an article transferred from said synchronizing conveyer arrives on said continuously moving conveyer at said selected location.

12. Apparatus for positioning articles at selected locations on a continuously moving conveyor element having means for driving said continuously moving conveyor element at a constant speed, comprising, a variable speed synchronizing conveyor in advance of the continuously moving conveyor, first means operatively associated with said synchronizing conveyor and controlled by an article thereon for varying the speed of said synchronizing conveyor at a controlled rate, and second means operatively associated with said continuously moving conveyor and said selected location for overriding the control by said first means and assuring that when an article is transferred from said synchronizing conveyor to said continuously moving conveyor said synchronizing conveyor has a velocity equal to the constant velocity of said continuously moving conveyor.

References Cited in the file of this patent

UNITED STATES PATENTS

| | | |
|---|---|---|
| 2,130,323 | Lueckel | Sept. 13, 1938 |
| 2,574,520 | Wood | Nov. 13, 1951 |
| 2,883,036 | Fox | Apr. 21, 1959 |
| 2,888,129 | Chapman | May 26, 1959 |